United States Patent [19]

Simms

[11] 4,076,766

[45] Feb. 28, 1978

[54] FLEXIBLE THERMOSETTING ACRYLIC ENAMELS

[75] Inventor: John Alvin Simms, Wilmington, Del.

[73] Assignee: E. I. Du Pont de Nemours and Company, Wilmington, Del.

[21] Appl. No.: 645,696

[22] Filed: Dec. 31, 1975

Related U.S. Application Data

[63] Continuation-in-part of Ser. No. 562,938, March 27, 1975, abandoned.

[51] Int. Cl.$^2$ .................. B32B 15/04; C08L 61/26
[52] U.S. Cl. .................. 260/850; 260/42.21; 260/42.22 CQ; 260/42.38; 260/851; 260/855; 260/856; 428/458; 428/465; 428/492; 428/425; 428/483; 428/457
[58] Field of Search .......... 260/850, 856, 873, 851, 260/856, 855; 428/457, 458, 465, 492

[56] References Cited

U.S. PATENT DOCUMENTS

| | | | |
|---|---|---|---|
| 3,310,512 | 3/1967 | Curtice | 260/850 |
| 3,352,806 | 11/1967 | Hicks | 260/851 |
| 3,461,186 | 8/1969 | Galiano et al. | 260/850 |
| 3,790,513 | 2/1974 | Victorius | 260/856 |

*Primary Examiner*—J. Ziegler

[57] ABSTRACT

A thermosetting acrylic enamel, useful for coating automobile and truck bumpers, flexible filler panels located between the bumper and the chassis, flexible fender extensions, and other energy absorbing parts, contains the following film-forming constituents:

(A) an acrylic polymer of an alkyl acrylate having 2–8 carbon atoms in the alkyl group, and $\alpha,\beta$-ethylenically unsaturated carboxylic acid, an alkyl methacrylate having 1–18 carbon atoms in the alkyl group or mixtures of such an alkyl methacrylate and styrene, and a hydroxyalkyl acrylate or methacrylate having 2–4 carbon atoms in the alkyl group or mixtures thereof;

(B) a polyester having a molecular weight not above 2,000, a hydroxyl number range of 50–150, and a glass transition temperature below 25°0 C; prepared from linear or branched chain diols, including ether glycols, or mixtures thereof or mixtures of diols and triols, containing up to and including 8 carbon atoms and a dicarboxylic acid, an anhydride thereof or mixtures of dicarboxylic acids, containing up to and including 12 carbon atoms, wherein at least 75% by weight, based on the weight of dicarboxylic acid, is an aliphatic dicarboxylic acid; and (C) a nitrogen resin corsslinking agent.

26 Claims, No Drawings

FLEXIBLE THERMOSETTING ACRYLIC ENAMELS

CROSS-REFERENCE TO RELATED APPLICATIONS

This application is a continuation-in-part of application Ser. No. 562,938, filed Mar. 27, 1975, now abandoned.

BACKGROUND OF THE INVENTION

This invention is related to coating compositions and in particular to flexible solvent based thermosetting acrylic enamels. The automobile and truck manufacturing industry is currently utilizing bumpers of a flexible material, flexible filler panels located between the bumper and the chassis, flexible fender extensions, flexible exterior trim parts, and other energy and impact absorbing parts to reduce damage in the event of a minor impact or a collision.

To provide the automobile or truck with a pleasing aesthetic appearance, a finish is applied to these parts. This finish must have excellent adherence to the substrate, be durable, flexible, and weatherable. However, substrates coated with conventional enamel finishes have often shown failure, such as cracking of the finish where the finish was exposed to low temperatures. The novel thermosetting acrylic enamel of this invention has excellent low temperature flexibility, adhesion to primers and substrates, and gasoline resistance.

SUMMARY OF THE INVENTION

According to the present invention there is provided a thermosetting acrylic enamel wherein the film-forming constituents of the enamel consist essentially of:
(A) 20-80% by weight, based on the weight of (A) plus (B) plus (C), of an acrylic polymer consisting essentially of:
  (1) 0-97% by weight, based on the polymer, of an alkyl acrylate having 2-8 carbon atoms in the alkyl group; provided that when this monomer is not present, there is present at least 20% of an alkyl methacrylate having 6-18 carbon atoms in the alkyl group;
  (2) 3-15% by weight, based on the weight of the polymer, of a hydroxyalkyl acrylate or methacrylate having 2-4 carbon atoms in the alkyl group or mixtures thereof;
  (3) 0-90% by weight, based on the weight of the polymer, of an alkyl methacrylate having 1-18 carbon atoms in the alkyl group or mixtures of an alkyl methacrylate having 1-18 carbon atoms in the alkyl group and styrene, wherein styrene does not exceed 75% by weight of said mixture; and
  (4) 0-10% by weight, based on the weight of the polymer, of an $\alpha,\beta$-ethylenically unsaturated carboxylic acid such as acrylic acid, methacrylic acid, itaconic acid, or mixtures thereof;
wherein components (1) through (4) total 100%, said acrylic polymer has an inherent viscosity, at 25° C, of 0.05-0.35 (determined as a 0.5% solution in 1,2-dichloroethane) and a glass transition temperature not exceeding 60° C;
(B) 10-50% by weight, based on the weight of (A) plus (B) plus (C), of a polyester prepared from linear or branched chain diols, including ether glycols or mixtures thereof or mixtures of diols and triols, containing up to and including 8 carbon atoms and a dicarboxylic acid, an anhydride thereof or mixtures of dicarboxylic acids, containing up to and including 12 carbon atoms, wherein at least 75% by weight, based on the weight of dicarboxylic acid, is an aliphatic dicarboxylic acid; wherein said polyester has a molecular weight not exceeding 2,000, a hydroxyl number range of 50-150, a maximum acid number of 10, and a glass transition temperature below 25° C; and
(C) 10-40% by weight, based on the weight of (A) plus (B) plus (C), of a nitrogen resin cross-linking agent;
wherein components (A), (B), and (C) add up to 100%.

DESCRIPTION OF THE INVENTION

The novel thermosetting acrylic enamel of this invention has a solids content of film-forming constituents of about 10 to 70% and preferably 15 to 40% by weight. This coating composition can be clear or pigmented and if pigmented can contain up to about a pigment/binder ratio of 100/100 and usually 50/100.

Optionally, the coating composition can contain colorants, wetting agents, antioxidants, fungicides, bactericides, viscosity control agents, and other conventional addivites for enamels.

The film-forming components of the thermosetting acrylic enamel contain 20-80% by weight of an acrylic polymer, 10-50% by weight of a polyester, and 10-40% by weight of a nitrogen resin crosslinking agent, based on the weight of these film-formers. Preferably, for the best balance of properties of low temperature flexibility, adhesion to primers and substrate, and gasoline resistance, the coating composition contains 30-60% by weight of the acrylic polymer, 20-40% by weight of the polyester, and 15-35% by weight of the nitrogen resin crosslinking agent. One preferred composition contains 30% by weight of the acrylic polymer, 40% by weight of the polyester, and 30% by weight of the nitrogen resin crosslinking agent. Another preferred composition is a 50/30/20 by weight ratio of these components.

The acrylic polymers utilized in the coating composition are prepared by conventional polymerization techniques in which the monomers are blended with solvents and polymerization catalysts and heated to about 60°-150° C for about 2-10 hours. About 0.1 to 4% by weight, based on the weight of the monomers used to prepare the acrylic polymer, of a polymerization catalyst is used. Typical catalyst are azo-bis-isobutyronitrile, azo-bis-alpha,gama-dimethylvaleronitrile, benzoyl peroxide, t-butyl peroxypivalate, ditertiary-butyl peroxide, and the like. Up to 5% by weight of the monomers of a chain transfer agent such as dodecylmercaptan or benzenethiol can be used to control molecular weight.

Typical solvents which can be used to prepare the acrylic polymer and also used as diluent in the coating composition used in this invention are toluene, xylene, butyl acetate, ethyl acetate, acetone, methyl ethyl ketone, methyl isobutyl ketone, ethyl alcohol, normal-butyl alcohol, other aromatic hydrocarbons, cycloaliphatic hydrocarbons, esters, ethers, ketones, and alcohols, such as are conventionally used.

The acrylic polymer of the thermosetting acrylic enamel used in this invention contains 0-97% by weight, based on the polymer, of an alkyl acrylate having 2-8 carbon atoms in the alkyl group, provided that when this monomer is not present then the polymer will contain at least 20% by weight, based on the polymer, of an alkyl methacrylate having 6–18 carbon atoms in the alkyl group. Typical alkyl acrylates which can be used are ethyl acrylate, butyl acrylate, isobutyl acrylate, and 2-ethylhexyl acrylate. Preferably the acrylic polymer contains 50–75% by weight of the alkyl acrylate having 2–8 carbon atoms in the alkyl group, and most preferably butyl acrylate. Typical alkyl methacrylates which can be used to replace the alkyl acrylates without losing the requisite flexibility and which provide additional outdoor durability for the acrylic enamel can include hexyl methacrylate, octyl methacrylate, lauryl methacrylate, stearyl methacrylate, and the like.

The acrylic polymer also contains 3–15% by weight, based on the polymer, of a hydroxyalkyl acrylate or methacrylate or a mixture thereof having 2–4 carbon atoms in the alkyl group. Typical compounds of this type are hydroxyethyl acrylate, hydroxypropyl acrylate, hydroxyethyl methacrylate, hydroxypropyl methacrylate, hydroxybutyl methacrylate, and the like. Preferably the acrylic polymer contains from 6–12% by weight of the hydroxyalkyl acrylate, preferably hydroxyethyl acrylate.

The acrylic polymer can also contain 0–90% by weight, based on the polymer, of an alkyl methacrylate having 1–18 carbon atoms in the alkyl group or a mixture of such alkyl methacrylate and styrene. When such mixture of monomers is used, styrene does not exceed 75% by weight of this mixture. Typical alkyl methacrylates which can be used in addition to those listed above are methyl methacrylate, ethyl methacrylate, propyl methacrylate, isopropyl methacrylate, butyl methacrylate, isobutyl methacrylate, and the like. Preferably, the acrylic polymer contains 10–30% by weight of methyl methacrylate or a mixture of methyl methacrylate and styrene or, in addition to methyl methacrylate, 20–80% by weight, based on the polymer, and preferably 30–60% by weight, of alkyl methacrylate having 6–18 carbon atoms in the alkyl group.

The acrylic polymer contains 0–10% by weight, based on the polymer, of an $\alpha,\beta$-ethylenically unsaturated carboxylic acid and preferably 1–5% by weight of the acid. Typical acids are acrylic acid, methacrylic acid, itatonic acid, crotonic acid, and the like. Preferred are acrylic acid and methacrylic acid.

The following is one group of preferred acrylic polymers: 50–75% by weight of butyl acrylate, 10–30% by weight of methyl methacrylate, 6–12% by weight of hydroxyethyl acrylate, and 1–5% by weight of acrylic acid or methacrylic acid. Another group of preferred polymers, having excellent durability, contains 20–65% by weight of methyl methacrylate, 20–60% of lauryl methacrylate or stearyl methacrylate, 6–12% by weight of 2-hydroxyethyl acrylate, and 1–5% by weight of acrylic acid or methacrylic acid. Still another group of preferred polymers contains 10–30% by weight of methyl methacrylate, 20–60% by weight of alkyl methacrylate having 12–16 carbon atoms in the alkyl group, 20–40% by weight of alkyl acrylate having 2–8 carbon atoms in the alkyl group, 0–35% by weight of normal-butyl methacrylate, 6–12% by weight of 2-hydroxyethyl acrylate, and 1–5% by weight of acrylic acid or methacrylic acid. One particularly preferred polymer that results in a high quality flexible finish contains 61% butyl acrylate, 26% methyl methacrylate, 10% hydroxyethyl acrylate, and 3% acrylic acid. A blend of acrylic polymers that has the final composition as indicated above can also be used in the acrylic enamel.

Among particularly preferred polymers resulting in a durable high quality flexible finish are included the following: 28% methyl methacrylate, 29% lauryl methacrylate, 30% normal-butyl acrylate, 10% 2-hydroxyethyl acrylate, and 3% acrylic acid; 26.4% methyl methacrylate, 51% lauryl methacrylate, 9.6% normal-butyl methacrylate, 10% 2-hydroxyethyl acrylate, and 3% acrylic acid; 26.4% methyl methacrylate, 30% stearyl methacrylate, 30.6% normal-butyl methacrylate, 10% 2-hydroxyethyl acrylate, and 3% acrylic acid.

The acrylic polymer of the thermosetting acrylic enamel used in this invention has an inherent viscosity, at 25° C, of 0.05–0.35, as determined as a 0.5% solution in 1,2-dichloroethane. The polymer has a glass transition temperature not exceeding 60° C and a hydroxyl number range of approximately 15–75. The hydroxyl number is defined as the number of milligrams of potassium hydroxide needed to neutralize the acetic acid generated during the analysis of a 1-gram sample.

The polyester of the thermosetting acrylic enamel of this invention is prepared from linear or branched chain diols, including ether glycols, or mixtures thereof or mixtures of diols and triols, containing up to and including 8 carbon atoms and a dicarboxylic acid, an anhydride thereof, or a mixture of dicarboxylic acids, containing up to and including 12 carbon atoms, wherein at least 75% by weight, based on the weight of dicarboxylic acid, is an aliphatic dicarboxylic acid. The polyester preferably comprises between 20–40% of the film-forming constituents of the thermosetting acrylic enamel.

Typical diols which can be used in the preparation of the polyester include ethylene glycol, 1,2-propylene glycol, 1,3-propylene glycol, 1,2-butylene glycol, 1,3-butylene glycol, 1,4-butylene glycol, neopentyl glycol, 2-methyl-2-ethyl-1,3-propanediol, 1,6-hexanediol, diethylene glycol, triethylene glycol, 2-ethyl-1,3-hexanediol, and the like. Preferably neopentyl glycol, 1,6-hexanediol or their mixtures, are utilized.

Typical triols which can be used in the preparation of the polyester include trimethylolpropane, trimethylolethane, glycerol, and 1,2,6-hexanetriol.

Typical dicarboxylic acids include succinic acid, sebacic acid, glutaric acid, adipic acid, azelaic acid, dodecanedioic acid, the isomeric phthalic acids, and the like. As is known to those skilled in the art, anhydrides of the dicarboxylic acids can also be utilized. A preferred diacid is adipic acid.

The polyesters of the thermosetting acrylic enamel of this invention meet two criteria: first, the polyesters have a glass transition temperature below 25° C and preferably below 0° C. As an example, a polyester prepared from neopentyl glycol and adipic acid has a glass transition temperature of −34° C. Second, in order that the polyester and the acrylic polymer of the thermosetting acrylic enamel of this invention be compatible the molecular weight of the polyester must not exceed approximately 2,000. Polyesters above this molecular weight may undergo phase separation from the acrylic polymers utilized in this invention and provide hazy films. Preferred molecular weight is approximately 1,000 as calculated from hydroxyl number values.

The stoichiometry of the polyester preparation is controlled by the final hydroxyl number and by the need to obtain a product of low acid number; an acid number below 10 is preferable. The acid number is defined as the number of milligrams of potassium hydroxide needed to neutralize a 1-gram sample of the polyester.

The nitrogen resin crosslinking agents are well-known in the art and comprise 10–40% by weight of the coating composition of this invention. Preferably the coating composition contains 15–35% of the crosslinking agent. These nitrogen resins are the alkylated products of amino resins prepared by the condensations of at least one aldehyde with at least one of urea, N,N'-ethylene urea, dicyandiamide, and amino triazines such as melamines and guanamines. Among the aldehydes that are suitable are formaldehyde, revertible polymers thereof such as paraformaldehyde, acetaldehyde, crotonaldehyde, and acrolein. Preferred are formaldehyde and revertible polymers thereof. The amino resins are alkylated with 1–6 alkanol molecules containing 1–6 carbon atoms. Preferably the amino resins are alkylated with 3–6 alkanol molecules, wherein the preferred alkanols are methanol or n-butanol. Preferred nitrogen resins include melamine resins such as partially butylated melamine-formaldehyde resins or partially methylated melamine-formaldehyde resins.

The nitrogen resins can be utilized neat or dissolved in organic solvents. Acceptable solvents include methanol, isopropanol, n-butanol, toluene, xylene, hydrocarbon solvents, 2-butoxy-1-ethanol, and mixtures thereof.

During the crosslinking reaction to be described below, the nitrogen resins can crosslink with themselves or they can crosslink with the hydroxy-functional acrylic polymers and the hydroxy-functional polyesters.

Optionally, an acid catalyst can be used in the coating composition to facilitate curing. Useful acid catalysts include the alkylated benzene sulfonic acids such as paratoluene sulfonic acid and the mono- and di- esters of phosphoric acid where the esterifying alcohols can be alkyl, cycloalkyl or aryl alcohols. Phosphoric acid itself can also be utilized. The composition can contain from 0–5% by weight of an acid catalyst.

The acid catalyst can be utilized when, for example, there is an absence of acid groups in the acrylic polymer, when a low temperature cure is required or when a highly etherified melamine resin such as hexamethoxymethylmelamine is used.

The thermosetting acrylic enamel of this invention can be pigmented. Typical pigments which can be used are metallic oxides, preferably titanium dioxide, zinc oxide, iron oxide, and the like, metallic flakes such as aluminum flake, metallic powders, metallic hydroxides, "Afflair" ® Flake pigments (a registered trademark of E. I. du Pont de Nemours and Company), i.e. mica coated with titanium dioxide sulfates, carbonates, carbon black, silica, talc, china clay, and other pigments, organic dyes, and lakes. The amount of pigment utilized can depend on the type of final application of the thermosetting acrylic enamel. Pigment/binder ratios between 3/100 and 100/100 can be utilized with the preferred P/B range being 3/100-50/100 for automotive applications and near the maximum P/B ratio of 100/100 for other industrial coatings.

The thermosetting acrylic enamel of this invention can be adhered to a substrate directly or a primer composition can be used to improve adhesion. Typical primers that can be used include polyalkylene ether glycols crosslinked with an aromatic diisocyanate and a polyester diol, chain-extended with an organic diisocyanate, and crosslinked with an alkylated melamine-formaldehyde resin.

A variety of substrates can be coated with the acrylic thermosetting enamel of this invention; the substrates can be rubbery, semi-rigid, and metallic. Examples of suitable substrates are flexible hydrocarbon rubbers such as EPDM (terpolymers of ethylene, propylene, and diene), butyl rubber, styrene-butadiene rubber, polybutadiene rubber or polyisoprene rubber; urethane and Hytrel ® (registered trademark of E. I. du Pont de Nemours and Company) polyester rubber; injection molded polyester urethane; elastoplastic microcellular urethane foam; ABS (terpolymers of acrylonitrile, butadiene, and styrene); steel; aluminum.

The thermosetting acrylic enamel of this invention can be applied by any of the standard application methods such as spray or roller coating and brushing. When the coating is applied by spraying it is possible to utilize spray solids higher than has been customary with most commercially useful prior art enamels. When a preferred solvent such as normal-butanol is included in the solvent system an enamel of up to 40% solids content can be sprayed. The coating thickness can be from 0.03 millimeter to 0.07 millimeter, the preferred thickness being aproximately 0.05 millimeter.

The thermosetting acrylic enamel of this invention can be cured at elevated temperatures. Typical curing conditions comprise heating the coating at approximately 100°–110° C for 1 hour or at approximately 150° C for 10 minutes. The coatings are cured at approximately 120° C for 30 minutes prior to carrying out the various tests to be described below.

The resulting dried and cured coating is a polyblend structure in which the acrylic polymer surrounds particles of the soft polyester polymer and the structure is crosslinked with the nitrogen resin. The above structure is the result of the hard acrylic polymer and the soft polyester polymer having borderline compatibility. In solution the polymers are completely homogeneous but a controlled degree of phase separation of the soft polymer from the hard polymer occurs when the solvents evaporate during film formation on drying of the coating. The crosslinking agent is compatible with both the hard and the soft polymers and is distributed through both phases and forms a uniformly crosslinked structure. As a result of this novel macroscopic compatibility and microscopic incompatibility of the acrylic polymer and the polyester upon film formation, there is obtained the thermosetting acrylic enamel of this invention.

This unique structure provides a coating with excellent toughness, flexibility, and gasoline resistance which are required for many end uses such as coatings for flexible substrates, finishes for plastics, coatings for coil or metals, finishes for foamed rubber and foamed plastics, post-formable coatings for metals, and the like.

A number of tests can be carried out to demonstrate the suitability for various final applications of the coatings based on the thermosetting acrylic enamel of this invention. The mandrel test is carried out by bending a coated sample panel around a 2, 1, and ½ inch mandrel, respectively, at room temperature and at −30° C. The coated specimens are examined for delamination and cracking. Samples showing no signs of cracking at the lower of the two temperatures can be utilized in applications where low temperature flexibility is a requirement.

The gasoline resistance of the coatings of this invention is determined by an immersion test in which the coated panels are immersed into gasoline 10 times, for 10 seconds each, with a 20-second interval between each of the immersions. Samples are then examined for softening of the coating by scraping it with the rounded end of a paper clip and for color removal by wiping over the surface of the coating with folded cheesecloth.

Additional tests, designed to provide information on long term stability of the coatings, can be carried out by soaking the samples in water at between 30°–35° C for 10 days. At the end of this period the panels are checked for blistering and are tested for loss of adhesion by peeling a piece of scotch tape from an X mark placed on the coating prior to the soaking cycle. Additional testing, in a weatherometer for exposure resistance and for gloss retention, can also be carried out.

The following examples illustrate the invention. All quantities are on a weight basis unless otherwise indicated.

EXAMPLE 1

(A)

Polymer solution A is prepared as follows:

| Portion 1 | Parts By Weight |
|---|---|
| Methyl methacrylate | 16.10 |
| Butyl acrylate | 68.03 |
| 2-Hydroxyethyl acrylate | 6.10 |
| Acrylic acid | 1.54 |
| n-Butanol | 142.74 |
| Portion 2 | |
| Butyl acetate | 9.14 |
| Benzoyl peroxide | 0.054 |
| (Containing 22% water) | |
| Portion 3 | |
| Methyl methacrulate | 102.40 |
| Butyl acrylate | 204.00 |
| 2-Hydroxyethyl acrylate | 38.80 |
| Acrylic acid | 11.90 |
| Benzoyl peroxide | 1.132 |
| (Containing 22% water) | |
| Portion 4 | |
| Butyl acetate | 31.60 |
| Benzoyl peroxide | 0.324 |
| (Containing 22% water) | |
| Portion 5 | |
| n-Butanol | 174.10 |
| | 807.96 |

Portion 1 is charged into a reaction vessel equipped with a stirrer, a pressure equalizer addition funnel, condenser, a thermometer, and a heating mantle and heated to its reflux temperature of about 120° C. Portion 2 is added in about one minute to initiate polymerization, followed by the addition of portion 3 at a uniform rate. This addition is complete in 90 minutes. Portion 4 is then added over a 60-minute period, at a uniform rate, while a slight reflux is maintained. After a further 15-minute period portion 5 is added.

The resulting polymer solution has a polymer solids content of about 55% by weight indicating that monomer conversion is substantially complete. The polymer has the composition: methyl methacrylate/butyl acrylate/2-hydroxyethyl acrylate/acrylic acid in a weight ratio of 26/61/10/3, and has an inherent viscosity, at 25° C, of 0.20, measured as a 0.5% solution in 1,2-dichloroethane, and has an acid number of 24.

(B)

Polymer solution B is prepared as follows:

| Portion 1 | Parts By Weight |
|---|---|
| Aromatic hydrocarbon mixture (boiling point range: 150-190° C) | 145.6 |
| Xylene | 156.6 |
| n-Butanol | 21.9 |
| Portion 2 | |
| Styrene | 242.9 |
| Butyl acrylate | 184.5 |
| 2-Hydroxyethyl acrylte | 39.6 |
| Acrylic acid | 18.7 |
| Ditertiarybutyl peroxide | 9.7 |
| t-Butyl peracetate (75% in mineral spirits) | 6.5 |

Portion 1 is charged into a reaction vessel equipped as above, and heated to its reflux temperature of about 134° C. Portion 2 is added over a 2-hour period while the reaction mixture is maintained at a slight reflux (134°–137° C) and for an additional 1.5 hours. Conversion of the monomers is substantially complete at this time. The polymer has a composition butyl acrylate/styrene/2-hydroxyethyl acrylate/acrylic acid//38/50/8/4 (by weight), a solids content of 60% by weight, and a Gardner-Holdt viscosity, at 25° C, of X-Z.

(C)

A mill base is prepared as follows:

| Portion 1 | Parts By Weight |
|---|---|
| Polymer solution B (prepared above) | 9.00 |
| Toluene | 4.50 |
| Anhydrous isopropanol | 3.60 |
| V.M. & P. naphtha | 3.90 |
| Portion 2 | |
| Titanium dioxide pigment | 63.00 |
| Portion 3 | |
| Polymer solution B (prepared above) | 16.00 |
| Total | 100.00 |

Portion 1 is charged into a high-speed mixer and mixed for 30 minutes and then portion 2 is added and mixed for an additional hour. Portion 3 is then added and mixed for 1 hour. The resulting composition is then passed through a conventional sand mill and ground at 20 gallons per minute in an 8 gallon unit to form a white pigment dispersion having a pigment to binder ratio of 413/100.

(D)

A coating composition is prepared by blending together the following ingredients:

| | Parts By Weight |
|---|---|
| White mill base (Prepared in (C) above) | 66.7 |
| Polymer solution A (Prepared above) | 36.4 |
| Polyester[1] | 40.0 |
| Butylated Melamine/Formaldehyde Resin[2] (55.5% solids) | 54.1 |
| n-Butanol | 108.0 |

[1]The polyester is prepared from adipic acid and neopentyl glycol, has a hydroxyl number of 90 and an acid number or 0.4.
[2]The nitrogen resin is dissolved in n-butanol and has a Gardner-Holdt viscosity, at 20° C, of I-O.

The resulting coating composition has a solids content of 45% by weight and a pigment/binder ratio of 42/100. The composition is applied to a thermoplastic urethane rubber substrate with a fixed-gap (10 mil) coating knife and cured for 30 minutes at 125° C. The resulting cured coating has excellent low temperature flexibility and satisfactory gasoline resistance.

EXAMPLE 2

The coating composition of Example 1 is applied to a steel sheet having a thickness useful in automobile construction (35 mil). Curing as above results in a film having a 1-5 KHN hardness and passing a zero T-bend test.

EXAMPLE 3

A coating composition is prepared as follows:

| Portion 1 | Parts By Weight |
|---|---|
| Polymer solution A [from Ex. 1 (A)] | 54.5 |
| Polyester (shown in Example 1) | 40.0 |
| Butylated Melamine/Formaldehyde Resin (55% solids, as described in Example 1) | 54.0 |
| Portion 2 | |
| Aluminum (medium-coarse flakes in paste form, at 65–66% solids in a blend of mineral spirits and high solvency naphtha) | 6.0 |
| Portion 3 | |
| n-Butanol | 140.0 |
| Portion 4 | |
| Ethyl acetate/cellosolve acetate (2/1 by weight) | 100.0 |

Portion 1 is blended at room temperature. To the blend is added portion 2 and mixed for 30 minutes at approximately 500 revolutions per minute. The composition is thinned to 35% (by weight) solids content by the addition of portion 3. The composition can be applied at this solids content or can be further thinned, by the addition of portion 4, for spray-application by an air suction spray-gun. The composition is sprayed onto a 0.25-inch thick "Nordel" ® (trademark of E. I. du Pont de Nemours and Company) rubber substrate which is a rubber of an ethylene-propylene-diene polymer and baked for 30 minutes at 125° C to give a finish about 1.8 mils in thickness. Before the rubber is coated with the composition, it is surface treated using the following procedure:

(1) The rubber substrate is immersed into a cleaning solution of 1.5% (by weight) Ridoline 72, manufactured by Amchem Products, Incorporated, Ambler, Pa.;
(2) The substrate is rinsed as follows:
Three 15 second rinses with the last rinse being with deionized water;
(3) The substrate is drained and dried;
(4) The dried substrate is sprayed with a 10% solution of benzophenone dissolved in xylene to deposit about 1.0–2.0 milligrams of dry benzophenone per square inch of surface of the substrate;
(5) The benzophenone coated surface is exposed to a quartz-jacketed mercury vapor containing 0.05–0.4 joules/square centimeter of radiation in the wave length band of 365 ± .5nm and allowed to cool to about 50° C.

The rubber substrate with the activated surface then is sprayed with the above composition and baked as indicated above. A uniform silver-gray metallic finish, having excellent gloss, results.

EXAMPLE 4

A coating composition is prepared as follows:

| Portion 1 | Parts By Weight |
|---|---|
| White mill base (prepared in Ex.1) | 66.7 |
| Polymer solution A [prepared in Example 1 (A)] | 72.7 |
| Polyester[1] | 30.0 |
| Partially Methylated Melamine/Formaldehyde Resin (80% solids in iso-propanol) | 25.0 |
| Portion 2 | |
| Mono- and di-phenyl phosphate (20% solids in n-butanol) | 2.5 |
| Portion 3 | |
| n-Butanol | 110.0 |

[1]The polyester is prepared from adipic acid, neopentyl glycol, and 1,6-hexanediol, has a molecular weight of approximately 1,000, a hydroxyl number of 100, and an acid number of 0.5.

Portion 1 is blended at room temperature. The acid catalyst (portion 2) is added and the blend thinned with portion 3. The resulting composition has a solids content of 45% by weight and a pigment/binder ratio of 42/100. When cast on a steel sheet and cured for 30 minutes at 125° C a uniform white glossy coating results.

EXAMPLE 5

(A)

Polymer solution A is prepared as follows:

| Portion 1 | Parts By Weight |
|---|---|
| Methyl methacrylate | 16.1 |
| n-Butyl acrylate | 34.0 |
| Lauryl methacrylate | 34.0 |
| 2-Hydroxyethyl acrylate | 6.1 |
| Acrylic acid | 1.5 |
| n-Butanol | 142.7 |
| Portion 2 | |
| Butyl acetate | 9.1 |
| Benzoyl peroxide (containing 22% water) | 0.054 |
| Portion 3 | |
| Methyl methacrylate | 102.4 |
| n-Butyl acrylate | 102.0 |
| Lauryl methacrylte | 102.0 |
| 2-Hydroxyethyl acrylate | 38.0 |
| Acrylic acid | 11.90 |
| Benzoyl peroxide (containing 22% water) | 1.132 |
| Portion 4 | |
| Butyl acetate | 31.60 |
| Benzoyl peroxide (containing 22% water) | 0.324 |
| Portion 5 | |
| n-Butanol | 174.10 |

Portion 1 is charged into a reaction vessel equipped with a stirrer, a pressure equalizer addition funnel, condenser, a thermometer, a heating mantle and heated to its reflux temperature of about 120° C. Portion 2 is added in about one minute to initiate polymerization, followed by the addition of portion 3 at a uniform rate. This addition is compete in 90 minutes. Portion 4 is then added over a 60-minute period, at a uniform rate, while a slight reflux is maintained. After a further 15-minute period portion 5 is added.

The resulting polymer solution has a polymer solids content of about 55% by weight indicating that monomer conversion is substantially complete. The polymer has the composition methyl methacrylate/lauryl methacrylate/n-butyl acrylate/2-hydroxyethyl acrylate/acrylic acid in a weight ratio of 28/29/30/10/3.

(B)

A coating composition is prepared as follows:

| Portion 1 | Parts By Weight |
|---|---|
| White mill base (prepared in Ex.1) | 66.7 |
| Polymer solution A [prepared above] | 72.7 |
| Polyester[1] | 30.0 |
| Partially Methylated Melamine/ Formaldehyde Resin (80% solids in iso-propanol) | 25.0 |
| Portion 2 | |
| Mono- and di-phenyl phosphate (20% solids in n-butanol) | 2.5 |
| Portion 3 | |
| n-Butanol | 110.0 |

[1]The polyester is prepared from adipic acid, neopentyl glycol, and 1,6-hexanediol, has a molecular weight of approximately 1,000, a hydroxyl number of 100, and an acid number of 0.5.

Portion 1 is blended at room temperature. The acid catalyst (portion 2) is added and the blend thinned with portion 3. The resulting composition has a solids content of 45% by weight and a pigment/binder ratio of 42/100. When cast on a steel sheet and cured for 30 minutes at 125° C a uniform white glossy coating results.

EXAMPLE 6

Example 5 is repeated by substituting the following polymer solution as Polymer Solution A:
Polymer solution A is prepared as follows:

(A)

| Portion 1 | Parts By Weight |
|---|---|
| Methyl methacrylate | 16.1 |
| n-Butyl methacrylate | 34.0 |
| Stearyl methacrylate | 34.0 |
| 2-Hydroxyethyl acrylate | 6.1 |
| Acrylic acid | 1.5 |
| n-Butanol | 142.7 |
| Portion 2 | |
| Butyl acetate | 9.1 |
| Benzoyl peroxide (containing 22% water) | 0.054 |
| Portion 3 | |
| Methyl methacrylate | 102.4 |
| n-Butyl methacrylate | 102.0 |
| Stearyl methacrylate | 102.0 |
| 2-Hydroxyethyl acrylate | 38.0 |
| Acrylic acid | 11.90 |
| Benzoyl peroxide (containing 22% water) | 1.132 |
| Portion 4 | |
| Butyl acetate | 31.60 |
| Benzoyl peroxide (containing 22% water) | 0.324 |
| Portion 5 | |
| n-Butanol | 174.10 |

Portion 1 is charged into a reaction vessel equipped with a stirrer, a pressure equalizer addition funnel, condenser, a thermometer, a heating mantle and heated to its reflux temperature of about 120° C. Portion 2 is added in about one minute to initiate polymerization, followed by the addition of portion 3 at a uniform rate. This addition is complete in 90 minutes. Portion 4 is then added over a 60-minute period, at a uniform rate, while a slight reflux is maintained. After a further 15-minute period portion 5 is added.

The resulting polymer solution has a polymer solids content of about 55% by weight indicating that monomer conversion is substantially complete. The polymer has the composition methyl methacrylate/stearyl methacrylate/n-butyl methacrylate/2-hydroxyethyl acrylate/acrylic acid in a weight ratio of 28/29/30/10/3.

(B)

A coating composition is prepared as follows:

| Portion 1 | Parts By Weight |
|---|---|
| White mill base (prepared in Ex.1) | 66.7 |
| Polymer solution A [prepared above] | 72.7 |
| Polyester[(1)] | 30.0 |
| Partially Methylated Melamine/ Formaldehyde Resin (80% solids in iso-propanol) | 25.0 |
| Portion 2 | |
| Mono- and di-phenyl phosphate (20% solids in n-butanol) | 2.5 |
| Portion 3 | |
| n-Butanol | 110.0 |

[(1)]The polyester is prepared from adipic acid, neopentyl glycol, and 1,6-hexanediol, has a molecular weight of approximately 1,000, a hydroxyl number of 100, and an acid number of 0.5.

Portion 1 is blended at room temperature. The acid catalyst (portion 2) is added and the blend thinned with portion 3. The resulting composition has a solids content of 45% by weight and a pigment/binder ratio of 42/100. When cast on a steel sheet and cured for 30 minutes at 125° C a uniform white glossy coating results.

EXAMPLE 7

Example 5 is repeated by substituting the following polymer solution as Polymer Solution A:
Polymer solution A is prepared as follows:

| Portion 1 | Parts By Weight |
|---|---|
| Methyl methacrylate | 16.1 |
| Lauryl methacrylate | 68.0 |
| 2-Hydroxyethyl acrylate | 6.1 |
| Acrylic acid | 1.5 |
| n-Butanol | 142.7 |
| Portion 2 | |
| Butyl acetate | 9.1 |
| Benzoyl peroxide (containing 22% water) | 0.054 |
| Portion 3 | |
| Methyl methacrylate | 102.4 |
| Lauryl methacrylate | 204.0 |
| 2-Hydroxyethyl acrylate | 38.0 |
| Acrylic aicd | 11.80 |
| Benzoyl peroxide (containing 22% water) | 1.132 |
| Portion 4 | |
| Butyl acetate | 31.60 |
| Benzoyl peroxide (containing 22% water) | 0.324 |
| Portion 5 | |
| n-Butanol | 174.10 |

Portion 1 is charged into a reaction vessel equipped with a stirrer, a pressure equalizer addition funnel, condenser, a thermometer, and a heating mantle and heated to its reflux temperature of about 120° C. Portion 2 is added in about one minute to initiate polymerization, followed by the addition of portion 3 at a uniform rate. This addition is complete in 90 minutes. Portion 4 is then added over a 60-minute period, at a uniform rate, while a slight reflux is maintained. After a further 15-minute period portion 5 is added.

The resulting polymer solution has a polymer solids content of about 55% by weight indicating that monomer conversion is substantially complete. The polymer has the composition: methyl methacrylate/lauryl methacrylate/2-hydroxyethyl acrylate/acrylic acid in a weight ratio of 28/59/10/3.

The coating obtained utilizing this polymer cured for 30 minutes at 125° C on a steel sheet is uniform, glossy, and flexible.

EXAMPLE 8

When Examples 5, 6, and 7 are repeated utilizing aluminum flakes as shown in Example 3, instead of the white mill base from Example 1, and the coatings are cured, either on a flexible substrate or on steel, the enamels have excellent gloss retention, as indicated by outdoor exposure or under simulated conditions.

What is claimed is:

1. A thermosetting acrylic enamel wherein the film-forming constituents consist essentially of:
   (A) 20-80% by weight, based on the weight of (A) plus (B) plus (C), of an acrylic polymer consisting essentially of:
   (1) 0-97% by weight, based on the weight of the polymer, of an alkyl acrylate having 2-8 carbon atoms in the alkyl group;
   (2) 3-15% by weight, based on the weight of the polymer, of a hydroxyalkyl acrylate or methacrylate having 2-4 carbon atoms in the alkyl group or mixtures thereof;
   (3) 0-90% by weight, based on the weight of the polymer, of an alkyl methacrylate having 1-18 carbon atoms in the alkyl group or a mixture of alkyl methacrylates having 1-18 carbon atoms in the alkyl group and styrene, wherein styrene does not exceed 75% by weight of said mixture; provided that when the alkyl acrylate of (1) is not present, there is present at least 20% by weight, based on the weight of the polymer, of such alkyl methacrylate having 6-18 carbon atoms in the alkyl group; and
   (4) 0-10% by weight, based on the weight of the polymer, of at least one alpha, beta-ethylenically unsaturated carboxylic acid selected from the group consisting of acrylic acid, methacrylic acid, itaconic acid, and crotonic acid; wherein components (1) through (4) total 100%, said acrylic polymer has an inherent viscosity, at 25° C, of 0.05-0.35, as determined as a 0.5% solution in 1,2-dichloroethane, and a glass transition temperature not exceeding 60° C;
   (B) 10-50% by weight, based on the weight of (A) plus (B) plus (C), of a polyester prepared from a linear or branched chain diol, including ether glycols, or mixtures thereof or mixtures of diols and triols, containing up to and including 8 carbon atoms and a dicarboxylic acid, an anhydride thereof or mixtures of dicarboxylic acids containing up to and including 12 carbon atoms, wherein at least 75% by weight, based on the weight of dicarboxylic acid, is an aliphatic dicarboxylic acid; wherein said polyester has a molecular weight not exceeding 2,000, a hydroxyl number range of 50-150, a maximum acid number of 10, and a glass transition temperature below 25° C; and
   (C) 10-40% by weight, based on the weight of (A) plus (B) plus (C), of an alkylated amine-aldehyde resin, an alkylated amide-aldehyde resin or mixtures thereof.

2. The thermosetting acrylic enamel of claim 1 wherein said acrylic polymer comprises 20-80% of said film-forming constituents and consists essentially of:
   (1) 20-40% by weight, based on the weight of the polymer, of an alkyl acrylate having 2-8 carbon atoms in the alkyl group;
   (2) 6-12% by weight, based on the weight of the polymer, of a hydroxyalkyl acrylate or methacrylate having 2-4 carbon atoms in the alkyl group or mixtures thereof;
   (3) 10-45% by weight, based on the weight of the polymer, of an alkyl methacrylate having 1-4 carbon atoms in the alkyl group;
   (4) 1-5% by weight, based on the weight of the polymer, of at least one $\alpha,\beta$-ethylenically unsaturated carboxylic acid selected from the group consisting of acrylic acid, methacrylic acid, itaconic acid, and crotonic acid; and
   (5) 20-60% by weight, based on the weight of the polymer, of an alkyl methacrylate having 12-16 carbon atoms in the alkyl group.

3. The thermosetting acrylic enamel of claim 1 wherein said acrylic polymer comprises 20-80% of said film-forming constituents and consists essentially of:
   (1) 20-60% by weight, based on the weight of the polymer, of an alkyl methacrylate having 12-16 carbon atoms in the alkyl group;
   (2) 6-12% by weight, based on the weight of the polymer, of a hydroxyalkyl acrylate or methacrylate having 2-4 carbon atoms in the alkyl group or mixtures thereof;
   (3) 20-65% by weight, based on the weight of the polymer, of an alkyl methacrylate having 1-4 carbon atoms in the alkyl group;
   (4) 1-5% by weight, based on the weight of the polymer, of at least one $\alpha,\beta$-ethylenically unsaturated carboxylic acid selected from the group consisting of acrylic acid, methacrylic acid, itaconic acid, and crotonic acid.

4. A thermosetting acrylic enamel wherein the film-forming constituents consist essentially of:
   (A) 20-80% by weight, based on the weight of (A) plus (B) plus (C), of an acrylic polymer consisting essentially of:
   (1) 10-97% by weight, based on the weight of the polymer, of an alkyl acrylate having 2-8 carbon atoms in the alkyl group;
   (2) 3-15% by weight, based on the weight of the polymer, of a hydroxyalkyl acrylate or methacrylate having 2-4 carbon atoms in the alkyl group or mixtures thereof;
   (3) 0-40% by weight, based on the weight of the polymer, of an alkyl methacrylate having 1-4 carbon atoms in the alkyl group or a mixture of alkyl methacrylates having 1-4 carbon atoms in the alkyl group and styrene, wherein styrene does not exceed 75% by weight of said mixture; and
   (4) 0-10% by weight, based on the weight of the polymer, of at least one $\alpha,\beta$-ethylenically unsaturated carboxylic acid selected from the group consisting of acrylic acid, methacrylic acid, itaconic acid, and crotonic acid;

wherein components (1) through (4) total 100%, said acrylic polymer has an inherent viscosity, at 25° C, of 0.05- 0.35, as determined as a 0.5% solution in 1,2-dichloroethane, and a glass transition temperature not exceeding 60° C;

(B) 10-50% by weight, based on the weight of (A) plus (B) plus (C), of a polyester prepared from a linear or branched chain diol, including ether glycols, or mixtures thereof or mixtures of diols and triols, containing up to and including 8 carbon atoms and a dicarboxylic acid, an anhydride thereof or mixtures of dicarboxylic acids containing up to and including 12 carbon atoms, wherein at least 75% by weight, based on the weight of dicarboxylic acid, is an aliphatic dicarboxylic acid; wherein said polyester has a molecular weight not exceeding 2,000, a hydroxyl number range of 50-150, a maximum acid number of 10, and a glass transition temperature below 25° C; and (C) 10-40% by weight, based on the weight of (A) plus (B) plus (C), of an alkylated amine-aldehyde resin, an alkylated amide-aldehyde resin or mixtures thereof.

5. The thermosetting acrylic enamel of claim 4 wherein said acrylic polymer comprises 20-80% of said film-forming constituents and consists essentially of:
   (1) 50-75% by weight, based on the weight of the polymer, of an alkyl acrylate having 2-8 carbon atoms in the alkyl group;
   (2) 6-12% by weight, based on the weight of the polymer, of a hydroxyalkyl acrylate or methacrylate having 2-4 carbon atoms in the alkyl group or mixtures thereof;
   (3) 10-30% by weight, based on the weight of the polymer, of an alkyl methacrylate having 1-4 carbon atoms in the alkyl group or a mixture of alkyl methacrylate having 1-4 carbon atoms in the alkyl group and styrene, wherein styrene does not exceed 75% by weight of said mixture; and
   (4) 1-5% by weight, based on the weight of the polymer, of at least one $\alpha,\beta$-ethylenically unsaturated carboxylic acid selected from the group consisting of acrylic acid, methacrylic acid, itaconic acid, and crotonic acid.

6. The thermosetting acrylic enamel of claim 4 wherein said acrylic polymer comprises 30-60% of said film-forming constituents and consists essentially of:
   (1) 50-75% by weight, based on the weight of the acrylic polymer, of butyl acrylate;
   (2) 6-12% by weight, based on the weight of the acrylic polymer, of hydroxyethyl acrylate;
   (3) 10-30% by weight, based on the weight of the acrylic polymer, of methyl methacrylate and styrene, wherein the weight of styrene does not exceed 75% by weight of said mixture; and
   (4) 1-5% by weight, based on the weight of the acrylic polymer, of acrylic acid, methacrylic acid or mixtures thereof.

7. The thermosetting acrylic enamel of claim 1 wherein said polyester comprises 20-40% by weight of said film-forming constituents and is prepared from at least one diol selected from the group consisting of ethylene glycol, 1,2-propylene glycol, 1,3-propylene glycol, 1,2-butylene glycol, 1,3-butylene glycol, 1,4-butylene glycol, 2-ethyl-1,3-hexanediol, neopentyl glycol, 2-methyl-2-ethyl-1,3-propanediol, 1,6-hexanediol, diethylene glycol, and triethylene glycol or a mixture of a diol with a triol selected from the group consisting of trimethylolpropane, trimethylolethane, glycerol, and 1,2,6-hexanetriol and an aliphatic dicarboxylic acid, an anhydride thereof or mixtures of dicarboxylic acids, wherein at least 75% by weight, based on the weight of said mixture, is an aliphatic dicarboxylic acid, wherein the dicarboxylic acid is selected from the group consisting of succinic acid, glutaric acid, adipic acid, azelaic acid, dodecanedioic acid, and the isomeric phthalic acids.

8. The thermosetting acrylic enamel of claim 1 wherein 15-35% by weight of said film-forming constituents is an alkylated melamine-formaldehyde resin.

9. The thermosetting acrylic enamel of claim 4 wherein said acrylic polymer consists essentially of:
   (1) 84-97% by weight, based on the polymer, of an alkyl acrylate having 2-8 carbon atoms in the alkyl group; and
   (2) 3-15% by weight, based on the weight of the polymer, of a hydroxyalkyl acrylate or methacrylate having 2-4 carbon atoms in the alkyl group or mixtures thereof.

10. A thermosetting acrylic enamel wherein the film-forming constituents consist essentially of:
   (A) 30-60% by weight, based on the weight of (A) plus (B) plus (C), of an acrylic polymer consisting essentially of:
     (1) 50-75% by weight, based on the weight of the polymer, of an alkyl acrylate having 2-8 carbon atoms in the alkyl group;
     (2) 6-12% by weight, based on the weight of the polymer, of a hydroxyalkyl acrylate or methacrylate having 2-4 carbon atoms in the alkyl group or mixtures thereof;
     (3) 10-30% by weight, based on the weight of the polymer, of an alkyl methacrylate having 1-4 carbon atoms in the alkyl group or a mixture of alkyl methacrylate having 1-4 carbon atoms in the alkyl group and styrene, wherein styrene does not exceed 75% by weight of said mixture; and
     (4) 1-5% by weight, based on the weight of the acrylic polymer, of acrylic acid, methacrylic acid or mixtures thereof.
     wherein components (1) through (4) total 100%, said acrylic polymer has an inherent viscosity, at 25° C, of 0.05-0.35, as determined as a 0.5% solution in 1,2-dichloroethane, and a glass transition temperature not exceeding 60° C;
   (B) 20-40% by weight, based on the weight of (A) plus (B) plus (C), of a polyester prepared from at least one diol selected from the group consisting of ethylene glycol, 1,2,-propylene glycol, 1,3-propylene glycol, 1,2,-butylene glycol, 1,3-butylene glycol, 1,4-butylene glycol, 2-ethyl-1,3-neopentyl glycol, 2-methyl-2-ethyl-1,3-propanediol, 1,6-hexanediol, diethylene glycol, and triethylene glycol or a mixture of a diol with a triol selected from the group consisting of trimethylolpropane, trimethylolethane, glycerol, and 1,2,6-hexanetriol and an aliphatic dicarboxylic acid, an anhydride thereof or mixtures of dicarboxylic acids, wherein at least 75% by weight, based on the weight of said mixture, is an aliphatic dicarboxylic acid, wherein the dicarboxylic acid is selected from the group consisting of succinic acid, glutaric acid, adipic acid, azelaic acid, and the isomeric phthalic acids; wherein said polyester has a molecular weight not exceeding 2,000, a hydroxyl number range of 50-150, a maximum acid number of 10, and a glass transition temperature below 25° C; and (C) 15-35% by weight, based on the weight of (A) plus (B) plus (C), of an alkylated melamine formaldehyde resin crosslinking agent.

11. The thermosetting acrylic enamel of claim 10 wherein said acrylic polymer consists essentially of:
(1) 50-75% by weight, based on the weight of the acrylic polymer, of butyl acrylate;
(2) 6-12% by weight, based on the weight of the acrylic polymer, of hydroxyethyl acrylate;
(3) 10-30% by weight, based on the weight of the acrylic polymer, of methyl methacrylate or a mixture of methyl methacrylate and styrene, wherein the weight of styrene does not exceed 75% by weight of said mixture; and
(4) 1-5% by weight, based on the weight of the acrylic polymer, of acrylic acid, methacrylic acid or mixtures thereof.

12. A thermosetting acrylic enamel wherein the film-forming constituents consist essentially of:
(A) 20% by weight, based on the weight of (A) plus (B) plus (C), of an acrylic polymer consisting essentially of:
(1) 61% by weight, based on the weight of the polymer, of butyl acrylate;
(2) 10% by weight, based on the weight of the polymer, of 2-hydroxyethyl acrylate;
(3) 26% by weight, based on the weight of the polymer, of methyl methacrylate; and
(4) 3% by weight, based on the weight of the polymer, of acrylic acid; and
10% by weight, based on the weight of (A) plus (B) plus (C), of an acrylic polymer consisting essentially of:
(1) 38% by weight, based on the weight of the polymer, of butyl acrylate;
(2) 8% weight, based on the weight of the polymer, of 2-hydroxyethyl acrylate;
(3) 50% by weight, based on the weight of the polymer, of styrene; and
(4) 4% by weight, based on the weight of the polymer, of acrylic acid;
said acrylic polymer has an inherent viscosity, at 25° C, of 0.1-0.3 as determined as a 0.5% solution in 1,2-dichloroethane;
(B) 40% by weight, based on the weight of (A) plus (B) plus (C), of a polyester prepared from neopentyl glycol and adipic acid; wherein said polyester has a molecular weight not exceeding 2,000, a maximum acid number of 5, and a hydroxyl number range of 70-110; and
(C) 30% by weight, based on the weight of (A) plus (B) plus (C), of a butylated melamine formaldehyde crosslinking agent;
wherein the enamel also contains pigment.

13. A thermosetting acrylic enamel wherein the film-forming constituents consist essentially of:
(A) 30% by weight, based on the weight of (A) plus (B) plus (C), of an acrylic polymer consisting essentially of:
(1) 61% by weight, based on the weight of the polymer, of butyl acrylate;
(2) 10% by weight, based on the weight of the polymer, of 2-hydroxyethyl acrylate;
(3) 26% by weight, based on the weight of the polymer, of methyl methacrylate; and
(4) 3% by weight, based on the weight of the polymer, of acrylic acid;
wherein said acrylic polymer has an inherent viscosity, at 25° C, of 0.1 to 0.3 as determined as a 0.5% solution in 1,2-dichloroethane;
(B) 40% by weight, based on the weight of (A) plus (B) plus (C), of a polyester prepared from neopentyl glycol and adipic acid; wherein said polyester has a molecular weight not exceeding 2,000, a maximum acid number of 5, and a hydroxyl number range of 70-110; and
(C) 30% by weight, based on the weight of (A) plus (B) plus (C), of a butylated melamine formaldehyde crosslinking agent;
wherein the enamel also contains pigment.

14. A thermosetting acrylic enamel wherein the film-forming constituents consist essentially of:
(A) 40% by weight, based on the weight of (A) plus (B) plus (C), of an acrylic polymer consisting essentially of:
(1) 61% by weight, based on the weight of the polymer, of butyl acrylate;
(2) 10% by weight, based on the weight of the polymer, of 2-hydroxyethyl acrylate;
(3) 26% by weight, based on the weight of the polymer, of methyl methacrylate; and
(4) 3% by weight, based on the weight of the polymer, of acrylic acid; and
10% by weight, based on the weight of (A) plus (B) plus (C), of an acrylic polymer consisting essentially of:
(1) 38% by weight, based on the weight of the polymer, of butyl acrylate;
(2) 8% by weight, based on the weight of the polymer, of 2-hydroxyethyl acrylate;
(3) 50% by weight, based on the weight of the polymer, of sytrene; and
(4) 4% by weight, based on the weight of the polymer, of acrylic acid;
said acrylic polymer has an inherent viscosity, at 25° C, of 0.1-0.3 as determined ad a 0.5% solution in 1,2-dichloroethane;
(B) 30% by weight, based on the weight of (A) plus (B) plus (C), of a polyester prepared from neopentyl glycol, 1,6-hexanediol, and adipic acid; wherein said polyester has a molecular weight between 700-1300, a hydroxyl number range of 70-110, and a maximum acid number of 5; and
(C) 20% by weight, based on the weight of (A) plus (B) plus (C), of a partially methylated melamine formaldehyde crosslinking agent;
wherein the enamel also contains pigment.

15. A thermosetting acrylic enamel wherein the film-forming constituents consist essentially of:
(A) 30% by weight, based on the weight of (A) plus (B) plus (C), of an acrylic polymer consisting essentially of:
(1) 30% by weight, based on the weight of the polymer, of butyl acrylate;
(2) 10% by weight, based on the weight of the polymer, of 2-hydroxyethyl acrylate;
(3) 28% by weight, based on the weight of the polymer, of methyl methacrylate;
(4) 3% by weight, based on the weight of the polymer, of acrylic acid; and
(5) 29% by weight, based on the weight of the polymer, of lauryl methacrylate;

wherein said acrylic polymer has an inherent viscosity, at 25° C, of 0.1 to 0.3 as determined as a 0.5% solution in 1,2-dichloroethane;
(B) 40% by weight, based on the weight of (A) plus (B) plus (C), of a polyester prepared from neopentyl glycol and adipic acid; wherein said polyester has a molecular weight not exceeding 2,000, a maximum acid number of 5, and a hydroxyl number range of 70–110; and
(C) 30% by weight, based on the weight of (A) plus (B) plus (C), of a butylated melamine formaldehyde crosslinking agent;
wherein the enamel also contains pigment.

16. A thermosetting acrylic enamel wherein the film-forming constituents consist essentially of:
(A) 30% by weight, based on the weight of (A) plus (B) plus (C), of an acrylic polymer consisting essentially of:
(1) 59% by weight, based on the weight of the polymer, of lauryl methacrylate;
(2) 10% by weight, based on the weight of the polymer, of 2-hydroxyethyl acrylate;
(3) 28% by weight, based on the weight of the polymer, of methyl methacrylate;
(4) 3% by weight, based on the weight of the polymer, of acrylic acid;
wherein said acrylic polymer has an inherent viscosity, at 25° C, of 0.1 to 0.3 as determined as a 0.5% solution in 1,2-dichlorethane;
(B) 40% by weight, based on the weight of (A) plus (B) plus (C), of a polyester prepared from neopentyl glycol and adipic acid; wherein said polyester has a molecular weight not exceeding 2,000, a maximum acid number of 5, and a hydroxyl number range of 70–110; and
(C) 30% by weight, based on the weight of (A) plus (B) plus (C), of a butylated melamine formaldehyde crosslinking agent;
wherein the enamel also contains pigment.

17. A flexible substrate coated with the thermosetting acrylic enamel of claim 12.
18. A flexible substrate coated with the thermosetting acrylic enamel of claim 13.
19. A flexible substrate coated with the thermosetting acrylic enamel of claim 14.
20. A flexible substrate coated with the thermosetting acrylic enamel of claim 15.
21. A flexible substrate coated with the thermosetting acrylic enamel of claim 16.
22. A metallic substrate coated with the thermosetting acrylic enamel of claim 12.
23. A metallic substrate coated with the thermosetting acrylic enamel of claim 13.
24. A metallic substrate coated with the thermosetting acrylic enamel of claim 14.
25. A metallic substrate coated with the thermosetting acrylic enamel of claim 15.
26. A metallic substrate coated with the thermosetting acrylic enamel of claim 16.

* * * * *